United States Patent

[11] 3,630,007

| [72] | Inventor | Gerhard Max Neumann<br>Berlin, Germany |
|------|----------|----------------------------------------|
| [21] | Appl. No. | 810,716 |
| [22] | Filed | Mar. 26, 1969 |
| [45] | Patented | Dec. 28, 1971 |
| [73] | Assignee | Delbag-Luftfilter Gesellschaft mit<br>beschrankter Haftung<br>Berlin, Germany |
| [32] | Priority | June 12, 1968 |
| [33] | | Germany |
| [31] | | P 17 57 764.9 |

[54] PLATE-SHAPED DISPOSABLE ACTIVE CHARCOAL FILTER
4 Claims, 3 Drawing Figs.

[52] U.S. Cl. .................................................. 55/387
[51] Int. Cl. .................................................. B01d 39/00

[50] Field of Search............................................ 55/74, 98,
179, 387, 483, 511, DIG. 31

[56] References Cited
UNITED STATES PATENTS

| 2,216,763 | 10/1940 | Boyce.......................... | 55/483 X |
| 3,168,917 | 2/1965 | Bartels.......................... | 55/DIG. 31 |
| 3,411,273 | 11/1968 | Duncan et al................. | 55/387 |

*Primary Examiner*—Reuben Friedman
*Assistant Examiner*—R. W. Burks
*Attorney*—Karl F. Ross ABSTRACT: A disposable active charcoal filter has a frame open at both sides and subdivided into a plurality of compartments by intersecting partitions. The two open sides are covered by gas-permeable sheets and the space between the sheets is filled with active carbon.

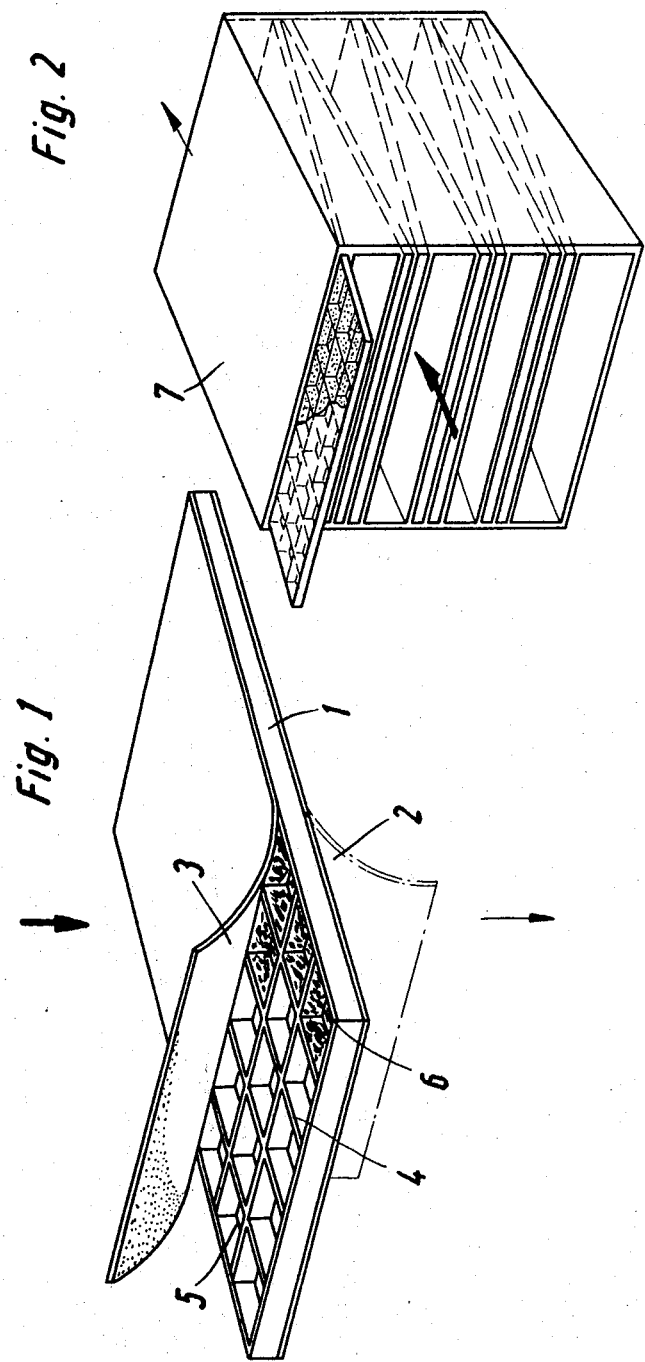

PLATE-SHAPED DISPOSABLE ACTIVE CHARCOAL FILTER

The invention relates to a disposable active charcoal filter.

It is known in gas-filtration technology to use active charcoal to eliminate unpleasant or noxious odorous substances from flowing gases. Granular active charcoal is received in casing which may be box shaped, round, cartridge shaped or in the form of plates. To pass the gas current through the active charcoal in the gas-filter casing, the casing walls, which extend transversely in relation to the gas current, are made of porous material, for example, wire sieves or perforated metal sheets. The active charcoal in the casing, having a low specific gravity (bulk density), tends to settle during the operation of the filter. It is therefore vibrated while being fed into the casing, to prevent the formation between the individual active charcoal grains of large spaces that would allow gas to pass through the filter without intimate contact with the active charcoal. This reduces settling during operation, but cannot prevent it completely, inasmuch as slight settling is unavoidable during operation because of abrasion of the active charcoal grains.

To prevent the disadvantageous effect of this settling on the efficiency of the filter, filters are designed and arranged so that the active charcoal can settle only in parallel with the gas current. This means, however, that the gas-permeable walls of the filter casing must lie in a horizontal plane. As a result, the gas current to be purified must be led vertically, yet the filter channels receiving the filter casing are horizontal or substantially horizontal. The use of active charcoal filters therefore causes fundamental difficulties, since the plate-shaped filter members can be disposed only vertically or, with a V-shaped or zigzag arrangement, only obliquely in relation to the horizontally or substantially horizontally led gas current.

To make this arrangement of the active charcoal filters possible, inserts have been provided between the gas-permeable casing walls and obliquely in relation to them. These inserts are placed at intervals one above the other and extend horizontally. Apart from the expense of making these casings, it is impossible to maintain a constant bed thickness, which is an essential condition of optimum efficiency. This is because of the settling of the active charcoal in the individual chambers formed by the inserts.

After saturation of the layer of active charcoal, the filter casing may be opened to remove the saturated active charcoal and refill the filter casing with fresh active charcoal. But if penetrating odorous substances or toxic gas particles are adsorbed by the active charcoal, it is not advisable to remove the active charcoal. It is therefore necessary to use plate-shaped active charcoal filters that can be thrown away after being used once.

These disposable active charcoal filters must satisfy certain conditions. The casings for receiving the active charcoal must be cheap enough to justify their being used only once. The casings must be acidproof and corrosionproof and, in particular, must have adequate bending resistance, even with considerable plate lengths. This is because the usual filter units have side lengths of 600 mm. or more. Sufficient bending strength with large plate dimensions raises special problems with regard to the demand for a low cost. Owing to the gas-permeable casing walls a slight pressure drop must be ensured even with a fairly thick layer. Another indispensable requirement is the prevention of leakage of unfiltered air and the greatest possible avoidance of settling by the active charcoal during operation. Ease of handling demands that the weight of the plates should be as small as possible, with the largest possible charcoal storage volume. The disposable filters should be easily destructible by heat. The active charcoal should not transmit abrasion dust to the pure-gas side of the filter plate, otherwise there will be a second filtering problem besides the elimination of gaseous impurities.

According to the invention, there is provided a disposable filter comprising a frame filled with active charcoal and open at both sides, the frame being subdivided by intersecting partitions into a plurality of compartments and having its two open sides covered by gas-permeable sheets secured to the edges of the outer walls and partitions of the frame.

The compartments are preferably square in outline and generally cubical in volume, i.e., the length of their sides is preferably approximately equal to the depth of the frame. Another advantageous feature is that the cross section of the partitions tapers towards the edges. It is also preferable that the frame be made of polystyrene.

The latticelike, for example square, rhombic or honeycombed, subdivision of the filter frame according to the invention has a twofold advantage. Firstly, by providing intersecting transverse walls, this subdivision gives the frame bending resistance. Secondly, it restricts the settling of the active charcoal by dividing the active charcoal layer into a plurality of small, separate zones.

With the usual frame size of, for example, 600×600 mm. and the usual layer thickness of 20 mm., the compartments may have side lengths of 20 mm., so that the filter plate is divided into 900 small compartments. Because of the multiplicity of intersecting transverse walls, this division gives the filter such great bending resistance that the open sides of the frame can be covered by thin, gas-permeable fiber cloth, sheets or glass mats. These gas-permeable fiber sheets may be connected to the edges of the outer walls and partitions of the frame by heat-sealing or bonding, so that the active charcoal in the individual compartments is securely enclosed.

To make one of these disposable filters, a gas-permeable sheet is first placed on one side of the frame. The active charcoal is then put in the frame from the other open side, the frame being vibrated while this is done. The active charcoal is then made smooth on the open side of the frame, after which the second gas-permeable covering sheet is put on. As the covering sheet is connected on both sides to the face sides of the longitudinal and transverse walls, the active charcoal is held securely in each compartment without allowing one of the covering sheets to sag. As the design of the frame gives it rigidity, a U-section prestressed seal placed around the edge of the filter provides an adequate seal with respect to a filter casing receiving the filter.

It is particularly advantageous to use a plastic material such as polystyrene for the frame and/or partitions, since this material can be given the necessary frame shape by injection molding. The gas-permeable covering sheets, which may also be made of suitable plastics material, can easily be connected to the edge surfaces of the outer walls and partitions of the frame by heat-sealing or bonding. Cardboard rendered hydrophobic or resin-impregnated paper are also suitable materials for the partitions.

The disposable active charcoal filters according to the invention may be disposed in a filter-channel casing either horizontally, vertically or obliquely. The subdivision of the active charcoal layer into a plurality of compartments ensures that settling during operation will not cause the formation of free gas channels through which the gas current to be purified can pass without thoroughly coming into contact with the active charcoal.

The accompanying drawing illustrates an exemplifying embodiment of the invention. Therein:

FIG. 1 is a perspective view of a one-way active charcoal filter,

FIG. 2 shows an arrangement of several active charcoal filters according to FIG. 1 in a horizontal filter casing.

Figure 3:
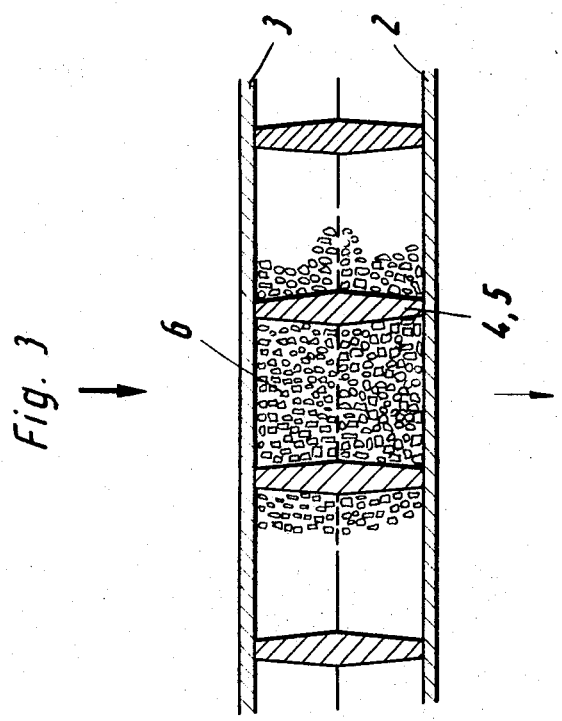
FIG. 3 shows a section through part of the filter on an enlarged scale.

As shown in FIG. 1, the filter consists of a frame 1 and two gas-permeable sheets 2 and 3 covering the frame. The frame 1 is subdivided by transverse walls 4 and 5 extending perpendicularly to each other to form a plurality of compartments open on both sides. The bottom gas-permeable sheet 2 is first placed on the frame 1. This sheet is connected to the lower edges of the outer walls of the frame and partitions 4 and 5 by heat-sealing and/or by bonding, so that it forms a firm bottom for the frame 1 in spite of its thinness.

Active charcoal 6 is then shaken into the compartments formed by the partitions 4 and 5. After the frame 1 has been smoothed, the top sheet 3 is connected to the frame 1 in the same manner as the sheet 2, so that the active charcoal 6 is held firmly in the small compartments between the sheets 2 and 3 and the compartment walls 4 and 5.

In FIG. 2, a plurality of active charcoal filters are disposed in a zigzag arrangement in a filter casing 7; the sides of the immediately adjacent filters can be interconnected in a gastight manner by covering strips. The gas current to be purified enters in this case between two filters, flows through them in an oblique direction and issues at the other end of the channel 7, after passing through the active charcoal filter.

FIG. 3 shows in an enlarged partial view the cross-sectional form of the intersecting partitions 4 and 5. The tapering of the partitions to both sides causes a narrowing in the middle of the gas-passage channel filled with active charcoal and bounded by adjoining partitions. If the active charcoal should settle during operation, the narrowing of the channel prevents the formation of a free gas passage through the filter without contact with the active charcoal, whether the filter is horizontal, vertical or oblique.

I claim:

1. A disposable filter comprising a rectangular frame, a set of orthogonally intersecting partitions in said frame dividing the interior thereof into a multiplicity of compartments open at opposite sides, and a pair of gas-permeable cover sheets overlying said compartments at said open sides in bonded relationship with said frame and said partitions, said partitions progressively increasing in cross section from said open sides to a midplane of the frame parallel to said sheets, said compartments being filled with activated charcoal on both sides of said midplane.

2. A filter as defined in claim 1 wherein said compartments have a substantially square outline.

3. A filter as defined in claim 2 wherein said compartments have a generally cubical volume.

4. A filter as defined in claim 1 wherein said sheets are flexible fiber mats.

* * * * *